United States Patent [19]

Hodgson et al.

[11] Patent Number: 4,875,538
[45] Date of Patent: Oct. 24, 1989

[54] REDUCED SIZE TRANSMISSION TUNNEL IN AN AUTOMOBILE AND A METHOD FOR THE SAME

[75] Inventors: Gordon Hodgson, Thorhnill; Douglas G. Broadhead, Scarborough; David J. Parent, Mississauga, all of Canada

[73] Assignee: AHA Automotive Technologies Corporation, Brampton, Canada

[21] Appl. No.: 168,366

[22] Filed: Mar. 15, 1988

[51] Int. Cl.4 .................................. B60K 23/00
[52] U.S. Cl. .................................. 180/379
[58] Field of Search .................. 180/75.2, 70.1; 464/7, 464/170

[56] References Cited

U.S. PATENT DOCUMENTS

| | | | |
|---|---|---|---|
| 2,465,785 | 3/1949 | Berno | 180/75.2 |
| 2,963,106 | 12/1960 | Sampietro | 180/75.2 |
| 3,089,559 | 5/1963 | Rieck | 180/75.2 |

FOREIGN PATENT DOCUMENTS 2332899 6/1977 France ........................ 180/75.2
996431 6/1965 United Kingdom ............ 180/75.2

Primary Examiner—Kenneth R. Rice
Attorney, Agent, or Firm—Rogers, Bereskin & Parr

[57] ABSTRACT

This invention relates to rear-wheel driven automobiles having an underhung carriage, an engine located at the front end, and a rear passenger compartment having a floor. In particular, the invention relates to a segmented drive shaft for transmitting rotation from the engine to the rear wheels, which is supported substantially below the floor. In this manner, the floor has a transmission tunnel of reduced size so that the floor is relatively flat. In the preferred embodiment the segmented drive shaft comprises three elements, between an output shaft of the transmission of the engine and a pinion of a rear differential. The first element is inclined downwardly from front to back, the second element is substantially parallel to the floor, and the third element may be inclined upwardly from front to back. The second element of the segmented drive shaft may comprise an outer non-rotating tube and an inner rotating tube, and lubrication fluid may also be provided therebetween.

18 Claims, 4 Drawing Sheets

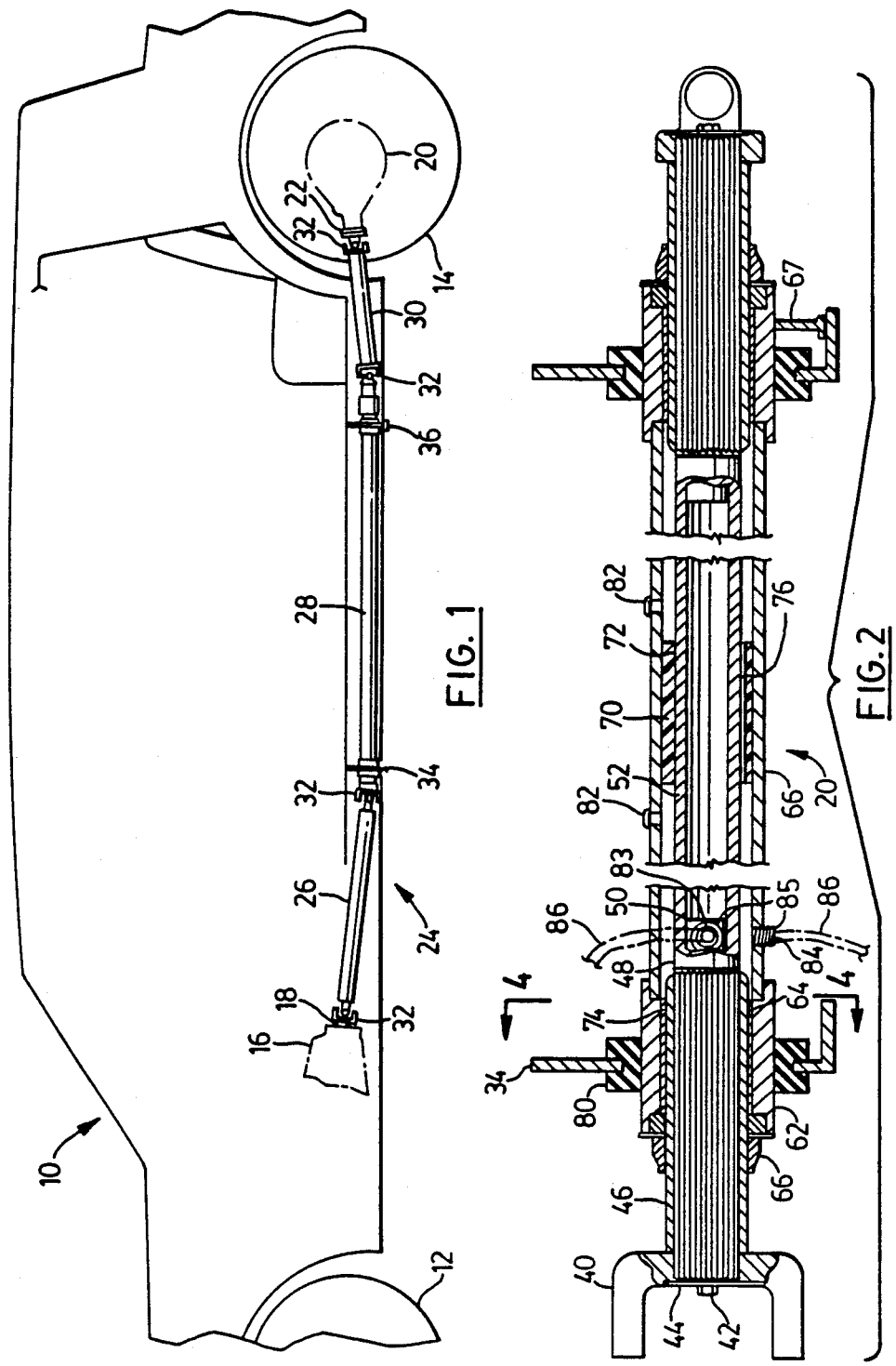

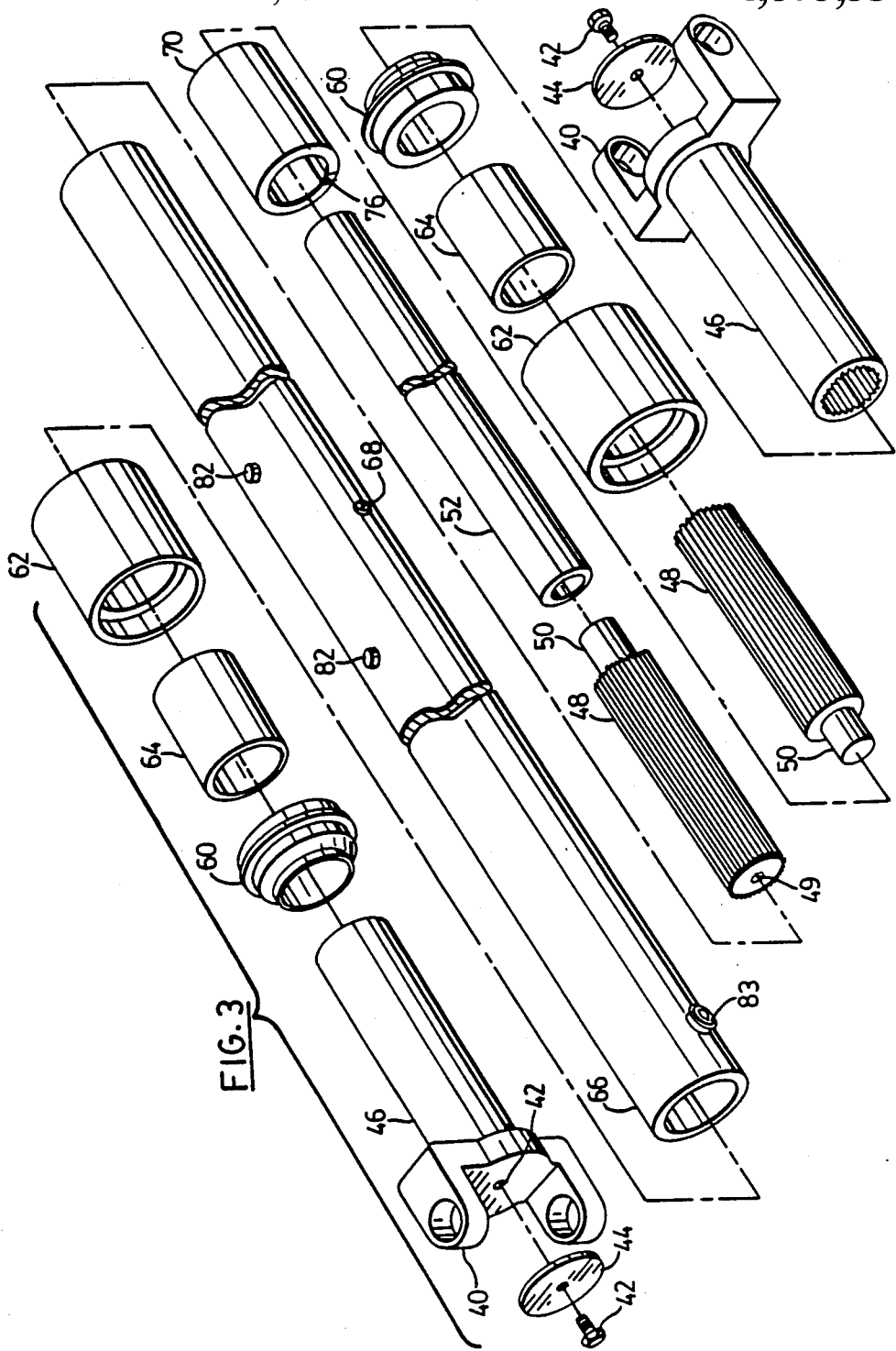

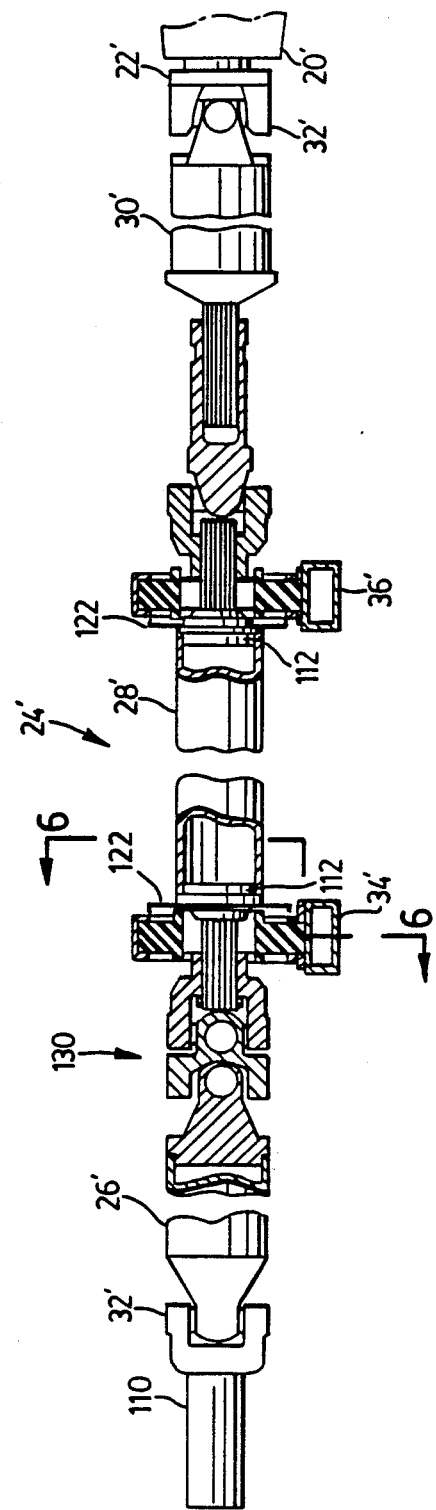
FIG. 5
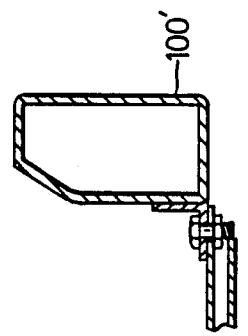
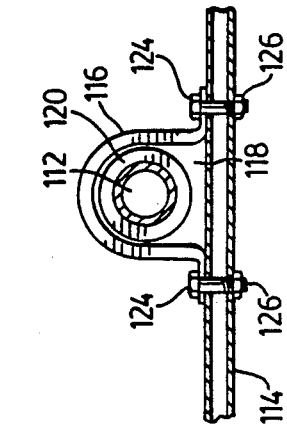
FIG. 6
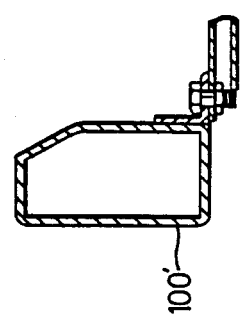

REDUCED SIZE TRANSMISSION TUNNEL IN AN AUTOMOBILE AND A METHOD FOR THE SAME

BACKGROUND OF THE INVENTION

This invention relates to rear wheel driven passenger automobiles having underhung carriages (meaning that the body is constructed with some portion of the body within the frame structure), an engine located at the front end, and a rear passenger compartment having a floor. In particular, this invention relates to such a passenger automobile in which a transmission tunnel runs centrally along the floor to accommodate a drive shaft.

In general, most modern front-engine rear-wheel drive automobiles, whether they are of unibody or frame construction, are designed to provide a maximum of internal space in the riding compartment. In addition, automobiles are also generally designed within certain height restrictions. To accommodate these competing objectives it is typical to have an underhung carriage which has the effect of maximizing the internal space in the automobile while maintaining an acceptable overall height. The underhung carriage results in the external hardware of the car, such as the drive shaft and exhaust pipes, being set into recesses in the body. An example of such a recess is the transmission tunnel, which is formed in the floor panels of the automobile. The recesses provide structural reinforcement, because they act as stiffening corrugations. This is especially true of the transmission tunnel.

In automobiles having underhung carriages, a typical transmission tunnel, for accommodating a conventional drive shaft, runs front to back centrally and results in a raised hump or bump which runs through the passenger space along the floor. The drive shaft connects the output shaft of the transmission at the rear of the engine with the pinion of the rear wheel differential. The rear wheel differential in turn transmits rotation and drive to the rear wheels. A splined slip yoke may be used to accommodate changes in the overall length of the drive shaft and is usually located on the output shaft of the transmission.

Typically, conventional drive shafts are one piece for automobiles having non-independent rear suspensions. In a one piece drive shaft universal joints are required at either end of the shaft, because as the rear suspension moves up and down to accommodate irregularities in the riding surface, so does the rear differential, and the shaft attached thereto. The transmission tunnel provided in the floor of the automobile must be large enough to accommodate this deflection of the drive shaft.

There are a few cars that have two piece drive shafts including extended wheel base limousines. Extended wheel base automobiles are made by taking a conventional full sized automobile, such as a Lincoln Town car, cutting the car in half and welding metal panels into the opening to provide the desired amount of increased length. In such applications, it is necessary to replace the shorter conventional drive shaft member with a longer two piece drive shaft assembly which still requires a transmission tunnel in the floor to accommodate it. At either end of the second segment of the drive shaft is located a universal joint.

In a two piece drive shaft, in automobiles having a non-independent rear suspension, the universal joints are necessary because the rear differential moves up and down with the rear suspension. Therefore, the rear end of the second segment of the drive shaft tends to ride up and down as the rear wheel suspension accommodates irregularities in the riding surface. This deflection of the drive shaft must be accommodated in the height of the transmission tunnel. To locate the two piece drive shaft in place a support is usually provided on the section of the shaft that does not move.

The transmission tunnel or hump that appears in the floor of the passenger compartment reduces the riding comfort of passengers, especially in the middle portion of the rear seat. Typically, such passengers are forced to rest their legs on the raised portion of the hump causing their knees to be uncomfortably high relative their seat. Alternatively, they can rest one leg on either side of the hump but this tends to impinge upon the foot space occupied by occupants on either side of the seat. In an extended wheel base car it is also typical to insert an auxiliary rear seat either facing forward or more commonly rearward. Typically full width bench seats, rather than bucket seats, are used. Two full width seats have seating capacity for six people, quite comfortably. However, the presence of the hump means that in practice, only four passengers can be accommodated comfortably.

The problem with the hump in the floor of the rear seat or the transmission tunnel is exacerbated in the case of such extended wheel base automobiles. With female passengers, in an extended wheel base car having opposed rear seats a modesty problem can be created by having the knees higher than the seat exposing undergarments.

Clearly it would be desirable, in conventional automobiles, and particularly in extended wheel base automobiles if the hump could be eliminated or substantially reduced in size or profile, without creating other problems, such as excessive vibration, an unacceptably low ground clearance or an unacceptable weakness in the body structure.

SUMMARY OF THE INVENTION

In accordance with the broad aspect of the present invention there is provided a rear wheel driven passenger automobile having an underhung carriage, an engine located at a front end, a rear passenger compartment having a floor and a rear passenger seat, the automobile including:

A segmented drive shaft having at least three elements for transmitting rotation from the transmission unit tot he rear wheels and including;

a first element connected between an output shaft of the transmission unit and a second element, the first element being inclined downwardly from front to back;

a second element connected between the first element and a third element and being generally parallel to and below the floor;

a third element connected between the second element and a pinion of a rear differential, the third element being located substantially below the rear passenger seat;

a substantially flat floor located in front of the rear passenger seat and including a transmission tunnel of reduced size, the transmission tunnel having a flat upper surface, sloping side surfaces and flat lower surfaces;

means for supporting the segmented drive shaft in placed below the floor, the supporting means comprising at least one hanger member fixed to the underside of the automobile, and having bearing means therein; and reinforcing means for reinforcing the automobile between the front and rear wheels, the reinforcing means comprising two reinforced floor panels being secured on either side of said transmission tunnel to said flat lower surfaces.

BRIEF DESCRIPTION OF THE DRAWINGS

Reference will now be made by example to the accompanying drawings showing preferred embodiments of the present invention and in which:

FIG. 1 is a side view in part section of a extended wheel base automobile having a segmented drive shaft according to one aspect of the present invention;

FIG. 2 is a side view in part section of a middle element of the drive shaft of FIG. 1;

FIG. 3 is an exploded view of the middle element of FIG. 2;

FIG. 5 is a side view partly in section of a second embodiment of the present invention, and, FIG. 6 is a sectional view along lines 6—6 of FIG. 5.

PREFERRED EMBODIMENT OF THE INVENTION

Figure 4:
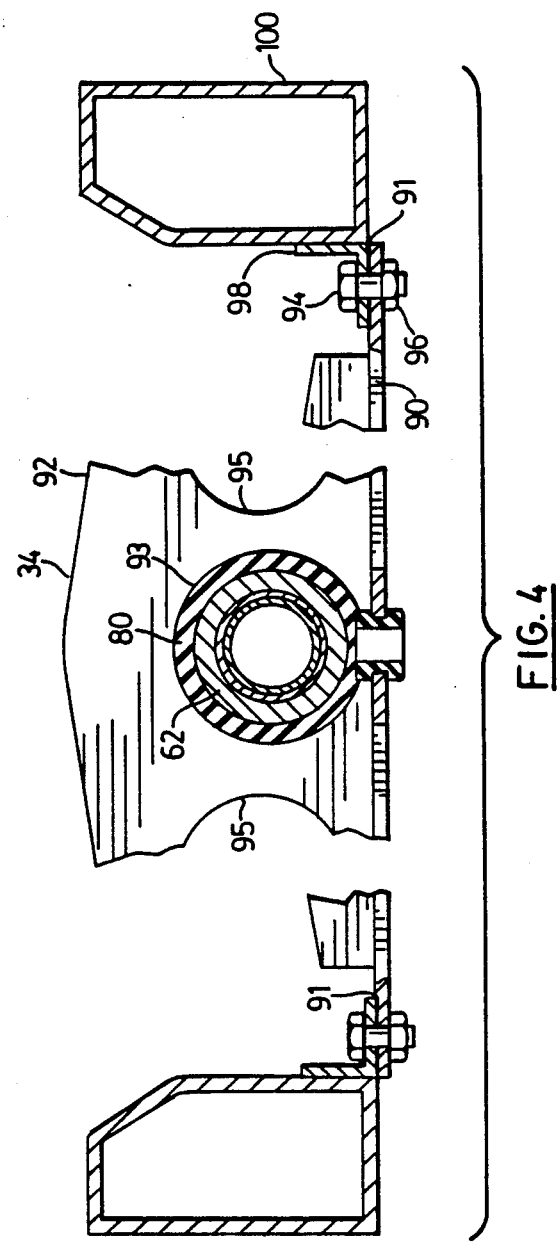
FIG. 4 is a sectional view along lines 4—4 of FIG. 2.

Referring to FIG. 1, an automobile indicated generally at 10 is shown in part section. The automobile 10 has front wheels 12 and rear wheels 14. A portion of a engine 16 is shown in ghost outline. Extending rearwardly from the engine is an output shaft of the transmission 18. Shown in ghost outlines as 20 is a rear differential having a pinion 22.

Located between the engine 16 and the rear differential 20 is a segmented drive shaft indicated generally as 24. The segment drive shaft is made up of a first element 26, a second element 28 and a third element 30. Located between each paid of elements, between the engine 16 and the first element 26 and between the third element 30 and the pinion 22 are a number of universal joints 32. The second element 28 is supported by means of two fixed hanger members which extend traversely across the underside of the automobile 10. There is a front hanger member 34 and a rear hanger member 36 which are described in more detail below.

Referring to FIG. 2 the second element 28 of the segmented drive shaft 24 is shown in cross sectional view. Reference will now be made to the rotating elements of second element 28. Beginning at the left hand side of FIG. 2 is shown a yoke 40 which comprises one half of the universal joint 32 between the first element 26 and the second element 28 of the segmented drive shaft 24. The yoke 40 is integrally formed and has a U-shaped portion 41 and a tube 46. The tube 46 has on its internal surface splines running longitudinally along the length of the tube 46. The inner surface of the tube 46 mates with the outside surface of a spline shaft 48. In this manner rotational movement is transmitted between the tube 46 and the spline shaft 48. By means of a screw 42, inserted through hole 43 and into hole 49, and a bearing plate 44, the spline shaft 48 is prevented from falling out of the tube 46. The screw 42 merely retains the spline 48 within yoke 40 and thus can be small gauge. It has been found that providing 31 splines at 60 degrees on the spline shaft 48 yields good results. Also, the spline shaft 48 is preferably heat-treated to provide a Rockwell hardness of 60.

The spline shaft 48 has a rearwardly extending securing post 50. The securing post 50 snuggly fits within an open end of a rotating inner tube 52. The rotating inner tube 52 is rigidly fastened to the securing post 50, again preferably by welding or the like. The joint needs to be sufficiently strong to withstand the torque applied to the drive shaft 24 by the engine 16. It will be appreciated that rotating inner tube 52 is preferably hollow, to reduce weight, but may also be made solid. The foregoing description completes the description of all of the rotating parts in the left hand half of the second element 28 of the segmented drive shaft 24 as shown in FIG. 2.

Now reference will be made to the stationary elements also by referring to FIGS. 2 and 3. Beginning at the left hand side, is shown a seal 60 which fits snuggly around the tube 46. The seal 60 is attached to a bushing housing 62. The bushing housing 62 carries on its inner surface an end bushing 64, which may be a tri-metal bushing formed from copper, steel and aluminum or the like. At the opposite end of bushing housing 62 from the seal 60 is located an outer tube 66. The outer tube may be attached to the bushing housing 62 by any conventional means such as welding. A bearing surface is provided between the end bushing 64 and the tube 46 and is indicated generally at 74. The outer surface of tube 46 would have a machined finish for this purpose. The bearing surface of end bushing 64 is preferably about two inches long.

Carried inside the outer tube 66 and secured thereto by a set screw 68 is a middle bushing 70. The set screw 68 extends through the side of outer tube 66 and into the bushing 70. In this manner the bearing surface is located between the outer surface of rotating inner tube 52 and the inner surface of middle bushing 70. This bearing surface is indicated at 72. The outer surface of inner tube 52 may also be provided with a machined finish in this area.

To facilitate the smooth running of bearing surfaces 72 and 74 it is preferrable to provide some form of lubrication. Satisfactory results have been obtained by half filling the outer tube 66 with 10W-30 engine oil or type "F" transmission fluid. The middle bushing 70 is preferably located approximately half way along the second element and may be made from a material such as nylon. A lubricating groove 76 is preferably provided at the lower-most point of bearing surface 72. The middle bushing 70 is preferably about three inches long.

While the foregoing description has concentrated on only one end of the second element it will be appreciated from the drawings that the ends of the second element are identical to each other, and accordingly the description of the second end is not repeated. However, while not necessary, as drawn the left hand yoke 40 is 90° out of phase with right hand yoke 40, which adds to the balancing and smooth running of the drive shaft 24.

The outer tube 66 may be provided with vents 82 and a filling hole 83 and drain holes 84. Both the filling hole 83 and the drain hole 84 would be resealable, by means of a screw plug 85 or the like. The vents 82 and resealable holes 83, 84 would be desirable where the outer tube 66 was half filled with lubricating fluid. However, as will be appreciated the vents 82 could be removed and instead conduits, 86, shown in ghost outline, could be run from the return of the transmission oil cooler to the outer tube 66 and back to the transmission. In this manner the need for separate shaft service would be eliminated as it would be done when the transmission was being serviced.

In terms of construction, it has been found that mild steel is an appropriate material for the inner tube 52 and the outer tube 66. The inner tube may be either hollow, or may be in the form of a solid shaft. The dimensions of these components depends upon the length of the second element 28, but in general, the following dimensions for the rotating inner shaft 52 have been found acceptable.

| Length | Solid | Tubular |
| --- | --- | --- |
| 30" to 50" | 1.250" | 1.25" × .250" |
| 50" to 70" | 1.375" | 1.375" × .250" |
| 70" to 100" | 1.500" | 1.500" × .250" |
| 100" to 140" | 1.625" | 1.625" × .250" |

Referring now to FIG. 4 the hanger member 34 is shown in broken section. The hanger member 34 is comprised of a first flat rectangular member 90 and a second flat triangular member 92. Members 90 and 92 are attached at right angles and may be formed from separate components welded together or may be integrally formed with a 90° bend therebetween. The hanger member 34 is isolated from the bearing housing 62 by a resilient insulating material shown as 80. The purpose of resilient material 80 is to prevent vibration in the second element of the drive shaft from being transmitted through the hanger member 34 to the body of the automobile and thereby to the occupants riding therein.

The triangular member 92 has a circular hole 93 cut out of its middle to accommodate the resilient material 80 which in turn supports the bushing housing 62. Also, shown in part at the break lines are orifices 95, which are made for the exhaust pipes of the automobile. The maximum possible ground clearance is obtained by having the exhaust pipes pass through member 92, as opposed to passing beneath it. The first member 90 is somewhat wider than the second member 92 and extends further on each side. As shown in FIG. 4 a bolt 94 and a nut 96 may be used to secure the first flat member 90 to an angle 98. The angle 98 in turn is attached to a portion of the frame 100 of the automobile. The angle 98 may be welded or fastened in any suitable manner to the frame 100. Alternatively, the first flat member 90 may be bolted directly onto the underside of the frame by drilling and tapping. Also, between the angle 98 and the member 90, may be located a resilient element 91, as shown, to reduce the vibration transmitted there between. The element 91 may be made from any suitable rubber or may be a series of stacked spring washers.

Turning to FIG. 1, the first element 26 of segmented drive shaft 24 is inclined downwardly from front to back. The second element 28 is generally parallel to the floor or frame of the automobile. The third element 30 may be positioned at any suitable angle either up or down within the limits of the U-joint. In some applications it may be advantageous to angle the third element identically to the first element, either up or down, to reduce vibration. In addition the second element 28 is relatively long compared to first element 26 and third element 30. It is desirable that the first and second elements are of such a length that the third element is as short as possible while maintaining its ability to transmit rotation smoothly through the universal joints at either end of element 30.

It has been found that good results are achieved in an extended wheel base Lincoln Town car when the first element 26 of the segmented drive shaft 24 is approximately 29¾" from centerline to centerline of the U-joints at either end. The third element 30 is preferably 17⅜", but may be slightly longer or shorter as described below. The second element 28, as measured from outside shoulder to outside shoulder of the bushing housings 62, can be made from 36" to 146" as desired.

When torque is applied to the segmented drive shaft 24 the forces act to lift middle or second segment 28 into horizontal alignment between the engine 16 and the differential pinion 22. Hanger members 34 and 36 must be sufficiently strong to resist this upward thrust. It has been found that by using 0.25" thick mild steel plate good results are achieved. The member 92 can have a height of 5" and a base of 57.25", with slightly squared shoulders as shown.

The above described segmented drive shaft 24 allows for a relatively flat floor in the rear compartment of an automobile by virtue of a number of factors. The first factor is that the drive shaft is of smaller diameter, along the second element, than typical drive shafts. The second factor is the location of the universal joints between the second and third elements. In the location shown, under the rear seat of the rear passenger compartment, there is no need to extend the transmission hump into the floor of the rear passenger compartment to accommodate deflection of the drive shaft as a result of the rear suspension moving up and down. Only the third segment 30 is subject to the movement of the rear suspension. Thus, a relatively shorter transmission tunnel, for only the third segment 30, can be installed, which is almost entirely located under the rear seat. In this manner the relatively flat floor is provided in the rear passenger compartment. However, it must be noted that standard -joints, as described herein, have a limited ability to transmit rotation through an angle, without developing vibration. In general, the greater the angle, the greater the vibration. Thus the third element 30 should not be too short. On the other hand, if the third element is made too long, then the size of the transmission tunnel in the floor of the rear passenger compartment will have to be increased. Therefore, while the size of the third element can vary, it has been found that 17⅜ is satisfactory.

In the preferred embodiment, it has been found difficult to eliminate the bump entirely from the floor of the rear passenger's compartment, partly because of the space required by the U-joints. However, it has been found that the transmission tunnel above the second element 28 can be reduced in height to two inches or less. With such a small hump in the floor, it is possible to pad or build up the other portions of the floor so that the bump is rendered virtually undetectable. In this manner, the effective seating capacity of the rear of the vehicle is increased by one third.

With the transmission tunnel of reduced size, the automobile will have lost some rigidity and strength that was formerly provided by the tunnel. This loss of strength can be made up for by increasing the gauge of the frame elements, if there are any, or by increasing the strength of other front to back components, such as the floor panels. In the extended wheel base Lincoln Town car of the present invention, satisfactory results have been obtained by reinforcing the floor panels.

Figure 7:
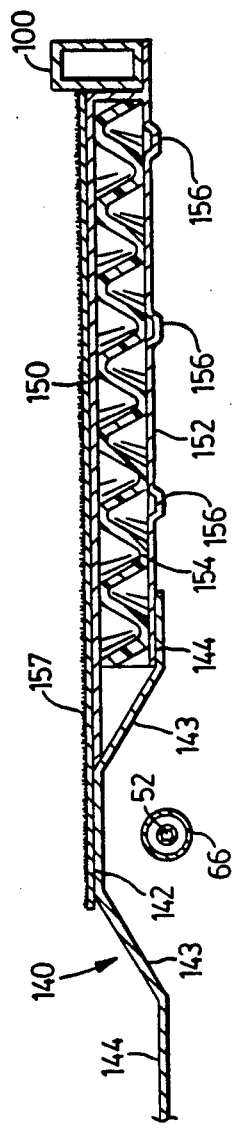
FIG. 7 is a detail view showing reinforced floor panels according to the present invention.

Referring to FIG. 7, a cross section through a portion of a reinforced floor is shown. A reduced height transmission tunnel 140 is shown, which has a flat upper surface 142 and inclined side surfaces 143. A section through the segmented drive shaft, showing inner tube 52 and outer tube 66 is also illustrated. Flat lower surfaces 144 are provided, to secure the tunnel 140 to the floor 146. The floor 146 is comprised of a number of elements, sandwiched together. The elements include upper and lower floor panels, 150 and 152 respectively, between which is located an expanded high strength plastic layer 154. The lower panel 152 may be provided with corrugations 156 to prevent "oil canning" when the floor is stepped on. The interior may be finished by means of a carpet 157. Preferably, the metal components are welded together, and are also bonded to the plastic layer 154. However, other forms of fastening may also be used. As illustrated in FIG. 7, the flat lower surface 144 would be welded to the underside of lower floor panel 152, and the lower floor panel 152, at the other side would be welded to rocker panel 100.

The expanded plastic layer 154 is in the form of a honey comb, with holes formed on opposite faces and having common side walls. The holes are generally circular at the open end and triangular at the closed end. This expanded plastic layer 154 is extremely light weight for its strength, and resists flexural displacement. It has been found that the product with the trade name NORCOR supplied by Norfield Corporation, is suitable in this regard.

Referring now to FIGS. 5 and 6 a second embodiment of the present invention is shown in sectional outline. In reference to FIGS. 5 and 6 like elements to the first embodiment are indicated with the same numerals with the addition of a prime. As shown in FIG. 5 a bearing yoke 110 is attached to one side of a universal joint 32'. The bearing yoke 110 would slide onto the output shaft of the transmission from the engine 16. The segmented drive shaft 24' consists of a first element 26' a second element 28' and a third element 30'. Between third element 30' and the differential pinion 22' of rear differential 20' is a second universal joint 32'. Unlike second element 28, second element 28' comprises a single rotating hollow tube. At either end of the hollow tube 28' are attached stub shafts 112.

Hanger members 34' and 36' are also somewhat different. A hollow rectangular tube 114 forms the basic horizontal member for each of hanger members 34' and 36'. A hanger bearing 116 as shown in FIGS. 6 is bent to form a guide within which is housed a resilient material 118. The hanger bearing may be formed out of 18 gauge steel and can be attached to the hollow rectangular member 114 by means of bolts and nuts 124 and 126 respectively. The resilient material 118 absorbs and prevents vibration from being transmitted to the frame 100'. The resilient material 118 in turn houses a roller bearing 120 which provides the bearing surface between the stub shaft 112 and the resilient material 118. A similar bearing arrangement is provided for both ends of the second element 28'.

In addition, there are provided flingers 122 which are secured to the stub shaft. One flinger 122 is provided immediately behind hanger member 34', whilst another is provided in front at hanger 36'. Others may be provided as deemed appropriate. The flinger 122 rotates and insures that dirt, mud and other material is not taken into the roller bearing. Because they will be rotating rapidly with the drive shaft any material which comes into contact with the flingers 122 will tend to be thrown off.

To accommodate the change in angle between the first shaft 26' and the second shaft 28' a Cardan joint indicated generally at 130 is provided. A Cardan joint consists essentially of two U-joints which are stacked onto each other. In this fashion the phase velocity problem which typically arises from a U-joint when it works through an angle is avoided. Essentially, the U-joints are balanced and because they are out of phase the speed variance due to the ellipse of the U-joint is cancelled. Thus, the same phase velocity that goes into the Cardan joint will come out of the Cardan joint. This provides a balanced speed of rotation, which facilitates the smooth running of the drive shaft 24. While the reference to the Cardan joint has been made only in respect of the second embodiment, it will be readily appreciated by those skilled in the art that a similar joint may also be usefully employed in the first embodiment. In certain applications of the present invention, such a Cardan joint has been found to provide satisfactory results.

In a Lincoln Town car that has had its wheel base extended by 54", satisfactory results have been obtained where the distance between the center line of front hanger member 34 and rear hanger member 36 is 62". The overall length of the segmented drive shaft in this case is 121" plus or minus approximately 1½. The length from the differential pinion 22 of rear differential 20 to the center of rear hanger member 36 is approximately 24½".

In addition, good results have been obtained when the downward angle with respect to the horizontal of the first element 26 of segmented drive shaft 24 is 2° to 7°. The second element 28 is preferably parallel to the frame or floor of the automobile. In a rest position, the third element 30 preferably forms an angle in a range of 2° upwardly or downwardly with respect to the frame or floor. However, the third element will achieve angles of up to approximately 17° positive (up) or 15° negative (down) as the rear suspension travels from full bump to full rebound.

As will be known to those skilled in the art, the movement of the rear suspension, from full bump to full rebound is not exactly vertical. To minimize the change in length of the drive shaft, it is typical to provide that the suspension move arcuately, along a portion of a circle having its center of rotation located somewhere forwardly along the drive shaft. However, even with such arcuate movement, the length of the drive shaft 24 can change from full bump through to full rebound. To accommodate such length changes, it is known to provide a slip yoke (not shown), in which a spline post slides freely within a spline tube.

As in the conventional drive shaft, in the present invention the slip yoke would be located on the output shaft of the transmission. Also, the segmented drive shaft 24 is preferably free floating, so that changes in its length can be accommodated without introducing axial stresses into the drive shaft elements. Consequently, inner tube 52 is permitted a limited amount of front to back travel within outer tube 66 in the preferred embodiment. This requires that the outer surface of the tube portion 46 of the yoke member 40, be machine polished along some of its length. In addition, it is beneficial to anchor the outer shaft 66 axially, by means of a bolt 67 or the like, attached to the hanger member 90.

It will be appreciated by those skilled in the art that certain modifications can be made to the invention, without departing from the spirit thereof. For example, while reference has been made throughout the specification to specific dimensions, these are provided by way of example only, and are not intended to be limiting. For example, it would be possible to install the present invention on makes of automobiles other than the Lincoln Town car such as on models made by Chrysler and General Motors, and in such case it may be necessary to vary certain of the dimensions to ones more suitable to such makes. Also, while the invention is particularly suited for extended wheel base automobiles, because of the premium placed on the available internal space in such automobiles, the invention is equally applicable to regular sized car models.

We claim:

1. A rear wheel driven passenger automobile having an under hung carriage, an engine located at a front end, a transmission unit, a rear passenger compartment having a floor and a rear passenger seat and the automobile including:
   a segmented drive shaft having at least three elements for transmitting rotation from the transmission unit to the rear wheels and including;
   a first element connected between an output shaft of the transmission unit and a second element, the first element being inclined downwardly from front to back;
   a second element connected between the first element and third element and being generally parallel to and below the floor;
   a third element connected between the second element and a pinion of a rear differential, the third element being located substantially below the rear passenger seat;
   a substantially flat floor located in front of the rear passenger seat and including a transmission tunnel of reduced size the transmission tunnel having a flat upper surface sloping, side surfaces and flat lower surfaces;
   means for supporting the segmented drive shaft in place below the floor, the supporting means comprising at least one hanger member fixed to the underside of the automobile, and having bearing means therein; and
   reinforcing means for reinforcing the automobile between the front and rear wheels, the reinforcing means comprising two reinforced floor panels being secured on either side of said transmission tunnel to said flat lower surfaces.

2. The rear wheel driven passenger automobile of claim 1 wherein the second element of the drive shaft comprises a fixed outer tube, and a rotating inner tube, the fixed outer tube being supported in place by the supporting means, and the rotating inner tube being supported in said outer tube by the bearing means comprising a plurality of bearing elements.

3. The rear wheel driven passenger automobile of claim 2 wherein said plurality of bearing elements comprise first and second end bushings and a middle bushing.

4. The rear wheel driven passenger automobile of claim 3 wherein said first and second end bushings comprise tri-metal sleeve bushings within a bushing housing, and the middle bushing is formed from nylon, is secured to the outer tube and has a groove for a lubricating fluid along the inner diameter thereof.

5. The rear wheel driven passenger automobile of claim 3 or 4 wherein the bearings are lubricated by a liquid lubricant within the outer tube, and the outer tube includes at least one of each of a vent hole and a closeable drain hole.

6. The rear wheel driven passenger automobile of claim 3 or 4 wherein said bearings are lubricated by means of a liquid lubricant, and which includes supply and return conduits connected between the transmission and the outer tube, whereby the lubricant can be supplied from and returned to the transmission of the automobile.

7. The rear wheel driven passenger automobile of claim 1, further including at least two hanger members fixed to and extending transversely across the underside of the automobile, and wherein at least one of the hanger members is located adjacent each end of the second element of the segmented drive shaft.

8. The rear wheel driven passenger automobile of claim 7, wherein the fixed hanger members comprise a first flat rectangular member and a second flat triangular member, the second member being attached to the upper surface of the first member at right angles thereto, and the second member having an opening to accommodate the outer tube therein.

9. The rear wheel driven passenger automobile of claim 7 wherein the automobile has located under the floor one or more exhaust pipes and each fixed hanger member comprises a first flat rectangular portion formed at right angles to a second upright triangular portion, the second upright triangular portion having a generally centrally located orifice to carry the segmented drive shaft therein, and one or more laterally offset orifices to accommodate the exhaust pipes therein.

10. The rear wheel driven passenger automobile of claim 9 further including vibration reduction means comprising first resilient elements between the rectangular portion and the underhung carriage of the automobile, and second resilient elements between the triangular portion and the outer tube of the second element of the segmented shaft.

11. A rear wheel driven passenger automobile as claimed in claim 1, wherein each reinforced floor panel comprises an upper panel, a lower panel, and an expanded plastic layer sandwiched therebetween.

12. A rear wheel driven passenger automobile as claimed in claim 11 wherein the lower panel includes a plurality of stiffening corrugations.

13. The invention of claim 1 wherein each of the first, second and third elements is comprised of a hollow tubular member.

14. The invention of claim 13 wherein a Cardan joint is located between said first element and said third element.

15. The invention of claim 1 wherein said automobile further includes non-independent rear suspension.

16. A method of reducing the size of a transmission tunnel as claimed in claim 15, further comprising the steps of:
   installing a three piece segmented drive shaft, having first, second and third elements, and
   connecting the first element between an output shaft of a transmission and the second element;
   connecting the second element between the first element and the third element; and
   connecting the third element between the second element and a pinion of a rear differential.

17. A method of reducing the size of a transmission tunnel as claimed in claim 16, wherein the step of reinforcing the automobile between the front and rear wheels comprises
   removing the existing floor panels;

constructing reinforced floor panels having an expanded honeycomb sandwiched between upper and lower panels, installing the reinforced floor panels on either side of the transmission tunnel of reduced size.

18. A method of reducing the size of a transmission tunnel for a drive shaft in a floor of a rear passenger compartment of a passenger automobile having an engine in the front end, a dependent rear suspension, an underhung carriage and a rear seat in the passenger compartment, the method comprising the steps:

(a) removing the drive shaft;

(b) eliminating a substantial portion of the height of the transmission tunnel for at least that portion of the tunnel in the floor of the rear passenger compartment and not under the rear seat by removing the existing transmission tunnel and installing a now transmission tunnel having a flat upper surface, sloped side surfaces and flat lower surfaces for attaching to the underside of reinforced floor panels;

(c) installing a segmented drive shaft between the engine and the rear wheels and having a rearmost element located beneath the rear passenger seat, the first element angled downwardly from the front to back and the second element parallel to the floor;

(d) supporting the segmented drive shaft from at least one hanger member having bearing means; and (e) reinforcing the automobile between the front and rear wheels.

* * * * *